United States Patent
Roxas et al.

(10) Patent No.: US 12,518,399 B2
(45) Date of Patent: Jan. 6, 2026

(54) INFORMATION PROCESSING APPARATUS, METHOD AND MEDIUM

(71) Applicant: Rakuten Group, Inc., Tokyo (JP)

(72) Inventors: Menandro Roxas, Tokyo (JP); Mitsuru Nakazawa, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 294 days.

(21) Appl. No.: 18/176,076

(22) Filed: Feb. 28, 2023

(65) Prior Publication Data
US 2023/0316538 A1 Oct. 5, 2023

(30) Foreign Application Priority Data
Mar. 29, 2022 (JP) .................... 2022-053262

(51) Int. Cl.
*G06T 7/20* (2017.01)
*B64U 10/00* (2023.01)
(Continued)

(52) U.S. Cl.
CPC ............... *G06T 7/20* (2013.01); *B64U 10/00* (2023.01); *G06T 5/40* (2013.01); *G06T 5/50* (2013.01);
(Continued)

(58) Field of Classification Search
CPC ... G06T 2207/20212; G06T 7/20; G06T 7/70; G06T 2207/30244; G06T 5/40;
(Continued)

(56) References Cited

U.S. PATENT DOCUMENTS 11,100,655 B2 *  8/2021  Matsui ................. G06T 7/215
11,381,726 B2    7/2022  Zass et al.
(Continued)

FOREIGN PATENT DOCUMENTS

JP       2020182048 A  *  11/2020

OTHER PUBLICATIONS

Khan, F.A., Nawaz, M., Imran, M. et al. Foreground detection using motion histogram threshold algorithm in high-resolution large datasets. Multimedia Systems 27, 667-678 (2021). https://doi.org/10.1007/s00530-020-00676-3 (Year: 2021).*

(Continued)

*Primary Examiner* — Utpal D Shah
*Assistant Examiner* — Jack Peter Kraynak
(74) *Attorney, Agent, or Firm* — Sughrue Mion, PLLC

(57) ABSTRACT

An information processing device 1 includes a motion acquisition unit 22 for acquiring a motion magnitude for each of a plurality of image elements included in a plurality of captured images, a threshold determination unit 23 for determining a threshold used to exclude image elements not to be included in a histogram showing a distribution of the motion magnitudes of the image elements, a histogram creation unit 24 for creating the histogram with respect to image elements, among the plurality of image elements, excluding image elements having motion magnitudes that exceed the threshold, a range estimation unit 25 for referring to the histogram in order to estimate a motion magnitude range corresponding to image elements capturing a predetermined part of the imaging subject, the predetermined part being within a predetermined distance range of an imaging position, and an image element specification unit 26 for specifying the image elements capturing the predetermined part by specifying the image elements belonging to the estimated range.

8 Claims, 11 Drawing Sheets

(51) Int. Cl.
*B64U 101/30* (2023.01)
*G06T 5/40* (2006.01)
*G06T 5/50* (2006.01)
*G06T 7/70* (2017.01)

(52) U.S. Cl.
CPC ............ *G06T 7/70* (2017.01); *B64U 2101/30* (2023.01); *G06T 2207/10032* (2013.01); *G06T 2207/20081* (2013.01); *G06T 2207/20212* (2013.01); *G06T 2207/30108* (2013.01); *G06T 2207/30244* (2013.01)

(58) Field of Classification Search
CPC ........... G06T 2207/30108; G06T 2207/10032; B64U 10/00; B64U 2101/30
See application file for complete search history.

(56) References Cited

U.S. PATENT DOCUMENTS

| | | | | |
|---|---|---|---|---|
| 2003/0086496 | A1* | 5/2003 | Zhang | G06V 20/40 348/172 |
| 2008/0187042 | A1 | 8/2008 | Jasinschi | |
| 2011/0044664 | A1* | 2/2011 | Yukawa | H04N 13/189 348/43 |
| 2012/0169937 | A1* | 7/2012 | Saito | H04N 5/147 348/700 |
| 2013/0011069 | A1* | 1/2013 | Quan | G06F 16/583 382/190 |
| 2013/0155058 | A1 | 6/2013 | Golparvar-Fard et al. | |
| 2013/0211790 | A1 | 8/2013 | Loveland et al. | |
| 2017/0132835 | A1 | 5/2017 | Halliday et al. | |
| 2017/0237904 | A1* | 8/2017 | Takahashi | H04N 23/683 348/208.1 |
| 2018/0020164 | A1* | 1/2018 | Yamazaki | H04N 23/6811 |
| 2019/0026958 | A1 | 1/2019 | Gausebeck et al. | |
| 2019/0180454 | A1* | 6/2019 | Choudhury | H04N 19/139 |
| 2021/0035455 | A1 | 2/2021 | Hall et al. | |
| 2021/0133996 | A1* | 5/2021 | Zhou | G06T 7/579 |
| 2021/0136515 | A1 | 5/2021 | Zhang et al. | |
| 2021/0232988 | A1 | 7/2021 | Thornberry et al. | |
| 2023/0099352 | A1 | 3/2023 | Cantwell, Jr. et al. | |
| 2023/0142394 | A1* | 5/2023 | Henry | G05D 1/229 382/103 |

OTHER PUBLICATIONS

Fang, S., et al., "A Framework of Power Pylon Detection for UAV-based Power Line Inspection" Information Technology and Mechatronics Engineering Conference, ITOEC 2020, IEEE, 5th, pp. 350-357 (8 pages).

Khan, F et al., "Foreground detection using motion histogram threshold algorithm in high-resolution large datasets", Multimedia Systems, Springer, 2021, vol. 27, pp. 667-678 (12 pages).

Junwon Seo, et al., "Evaluating the Use of Drones for Timber Bridge Inspection", United States Department of Agriculture, Aug. 2018, pp. 2-146 (152 pages).

* cited by examiner

INFORMATION PROCESSING APPARATUS, METHOD AND MEDIUM

CROSS-REFERENCE TO RELATED APPLICATION

This application is based upon and claims the benefit of priority of Japanese Patent Application No. 2022-053262, filed on Mar. 29, 2022, the entire contents of which are incorporated herein by reference.

FIELD

The present disclosure relates to image processing technology.

BACKGROUND

An image processing device capable of acquiring a panoramic image of an imaging subject that is larger than the imaging range of a camera by including a subject extraction unit for extracting parts of respective captured images that include a predetermined velocity vector as parts of the imaging subject, a relative position calculation unit that calculates the relative position of each captured image, and a creation unit that creates an enlarged image including a wider range than the imaging range by arranging the captured images on the basis of the relative positions has been proposed in the prior art (see Japanese Patent Application Publication No. 2020-182048).

SUMMARY

Various techniques for extracting, from a captured image, image elements capturing a predetermined part of the imaging subject (for example, the structure closest to the imaging position or the like) have been proposed in the prior art. However, when extraction is performed using machine learning or the like, problems occur in terms of the extraction accuracy, and moreover, in order to improve the accuracy, problems such as the need for an additional sensor (a ToF (Time of Flight) sensor or the like, for example) to detect the three-dimensional shape of the imaging subject arise, making it difficult to improve the accuracy when extracting image elements capturing a predetermined part of the imaging subject from a captured image.

In consideration of the problems described above, an object of the present disclosure is to improve the accuracy when extracting image elements capturing a predetermined part of an imaging subject from a captured image.

An example of the present disclosure is an information processing device including motion acquiring means for acquiring, on the basis of a plurality of captured images acquired by performing image capture while varying a positional relationship between an imaging subject and an imaging position, a motion magnitude for each of a plurality of image elements constituting the captured images on the images of the imaging subject, threshold determining means for determining a threshold used to exclude image elements not to be included in a histogram showing a distribution of the motion magnitudes of the plurality of image elements on the basis of the motion magnitudes of the image elements, histogram creating means for creating the histogram with respect to image elements, among the plurality of image elements, excluding image elements having motion magnitudes that exceed the threshold, range estimating means for referring to the histogram in order to estimate a motion magnitude range corresponding to image elements capturing a predetermined part of the imaging subject, the predetermined part being within a predetermined distance range of the imaging position, and image element specifying means for specifying the image elements capturing the predetermined part, among the plurality of image elements constituting the captured images, by specifying the image elements belonging to the estimated motion magnitude range.

The present disclosure can be understood as an information processing device, a system, a method executed by a computer, or a program for causing a computer to execute processing. The present disclosure can also be understood as an invention in which such a program is recorded on a recording medium that can be read by a computer or another device, machine, or the like. Here, a recording medium that can be read by a computer or the like denotes a recording medium on which information such as data and programs can be stored by an electrical, magnetic, optical, mechanical, or chemical action and read from a computer or the like.

According to the present disclosure, it is possible to improve the accuracy when extracting image elements capturing a predetermined part of an imaging subject from a captured image.

DESCRIPTION OF EMBODIMENTS

Figure 1:
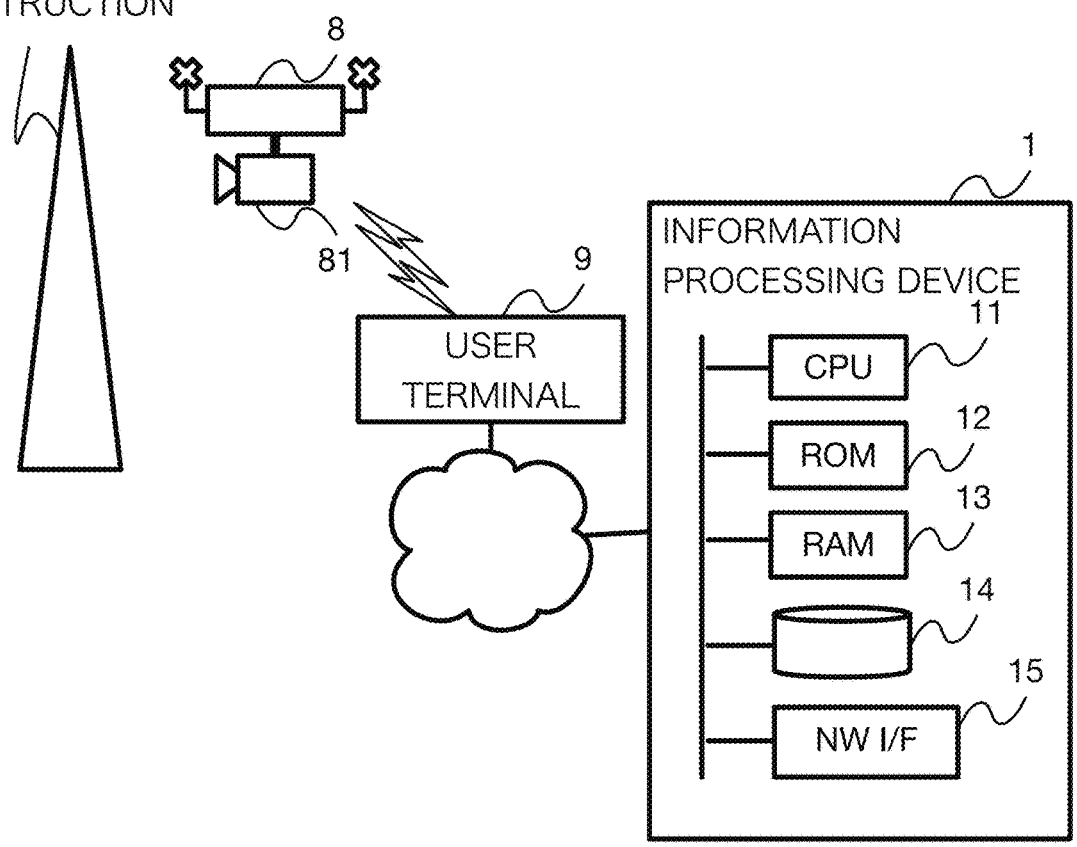
FIG. 1 is a schematic view showing a configuration of a system according to an embodiment.

An embodiment of an information processing device, a method, and a program according to the present disclosure will be described below based on the figures. Note that the embodiment to be described below is an example embodiment, and the information processing device, method, and program according to the present disclosure are not limited to the specific configurations described below. Upon implementation, specific configurations corresponding to modes of implementation may be employed as appropriate and subjected to various improvements and modifications.

In this embodiment, a case in which the technology according to the present disclosure is implemented for the purpose of monitoring and inspecting a construction such as a steel tower (pylon) will be described. Note, however, that the technology according to the present disclosure can be used widely in order to process a captured image of a subject, and the subject to which the present disclosure is applied is not limited to the example illustrated in the embodiment.

Conventionally, constructions such as steel towers that are envisaged as being used as base stations for communication networks have generally been monitored and inspected by sight. In recent years, however, digital transformation (DX) applied to inspections of such constructions is being promoted, and various techniques for replacing conventional monitoring and inspection by sight with monitoring and inspection using flying objects such as drones have been proposed. For example, an inspection technique that makes full use of imaging processing and image analysis of a construction has been proposed, and this inspection technique is expected to have the effect of reducing the labor and the burden of manual work required to inspect constructions, and is also expected to facilitate identification of individual unit structures and members of constructions and detection of abnormalities therein. However, various problems exist in this proposed technique.

For example, in order to monitor and inspect a construction serving as a subject based on a captured image, various techniques for extracting image elements capturing a predetermined part of the construction (for example, the structure closest to the imaging position or the like) from the captured image have been proposed in the prior art. However, when extraction is performed using machine learning or the like, problems occur in terms of the extraction accuracy, and moreover, in order to improve the accuracy, problems such as the need for an additional sensor (a ToF (Time of Flight) sensor or the like, for example) to detect the three-dimensional shape of the construction arise, making it difficult to improve the accuracy when extracting image elements capturing a predetermined part of the imaging subject from a captured image.

Further, in this embodiment, in order to monitor and inspect a long construction such as a steel tower, an image processing technique of synthesizing a set of captured images of the construction, captured using a flying object such as a drone, and generating a single panoramic image covering the entire construction is employed. With this proposed technique, however, the velocity vector of the flying object, such as a drone, serving as the imaging means may change due to the effect of an incidental phenomenon such as a gust of wind, and when this type of incidental phenomenon occurs, it may become difficult to specify the relative positions of the respective captured images, making it difficult to generate a suitable panoramic image.

In addition, when a long construction such as a steel tower is monitored and inspected, it is necessary to ascertain the positions on the construction to which the captured images of the construction correspond. Moreover, in view of the fact that a construction such as a steel tower is constituted by a large number of members, it is necessary to ascertain the location shown by one random captured image that merely corresponds to a part of the construction. With the technique proposed in the prior art, however, there is room for improvement in terms of comprehensively recognizing unit structures and members constituting the construction on the captured images of the construction.

Having taken the problems described above into consideration, it is possible, with the information processing device, method, and program according to this embodiment, to provide novel techniques for improving the accuracy when extracting image elements capturing a predetermined part of a construction from a captured image, generating a suitable panoramic image even when image capture of the construction is affected by an incidental phenomenon, and comprehensively recognizing unit structures and members constituting the construction on captured images of the construction.

<System Configuration>

FIG. 1 is a schematic view showing a configuration of a system according to this embodiment. The system according to this embodiment includes an information processing device 1, a drone 8, and a user terminal 9, which are connected to a network so as to be able to communicate with each other.

The information processing device 1 is a computer including a CPU (Central Processing Unit) 11, a ROM (Read Only Memory) 12, a RAM (Random Access Memory) 13, a storage device 14 such as an EEPROM (Electrically Erasable and Programmable Read Only Memory) or an HDD (Hard Disk Drive), a communication unit 15 such as an NIC (Network Interface Card), and so on. Note, however, that omissions, replacements, and additions may be made as appropriate in relation to the specific hardware configuration of the information processing device 1 in accordance with the embodiment. Further, the information processing device 1 is not limited to a device having a single casing. The information processing device 1 may be realized by a plurality of devices using a so-called cloud or dispersed computing technique or the like.

The drone 8 is a small unmanned aircraft, the flight of which is controlled in accordance with input signals from the outside and/or a program recorded on a device, and the drone 8 includes a propeller, a motor, a CPU, a ROM, a RAM, a storage device, a communication unit, an input device, an output device, and so on (not shown in the figure). Note, however, that omissions, replacements, and additions may be made as appropriate in relation to the specific hardware configuration of the drone 8 in accordance with the embodiment. Further, the drone 8 according to this embodiment includes an imaging device 81, and when flying around a subject construction, captures images of the construction in response to an input signal from the outside and/or a program recorded on a device.

The user terminal 9 is a terminal device used by a user. The user terminal 9 is a computer including a CPU, a ROM, a RAM, a storage device, a communication unit, an input device, an output device, and so on (not shown in the figure). Note, however, that omissions, replacements, and additions may be made as appropriate in relation to the specific hardware configuration of the user terminal 9 in accordance with the embodiment. Further, the user terminal 9 is not limited to a device having a single casing. The user terminal 9 may be realized by a plurality of devices using a so-called cloud or dispersed computing technique or the like. The user uses various services provided by the system according to this embodiment via the user terminal 9.

Figure 2:
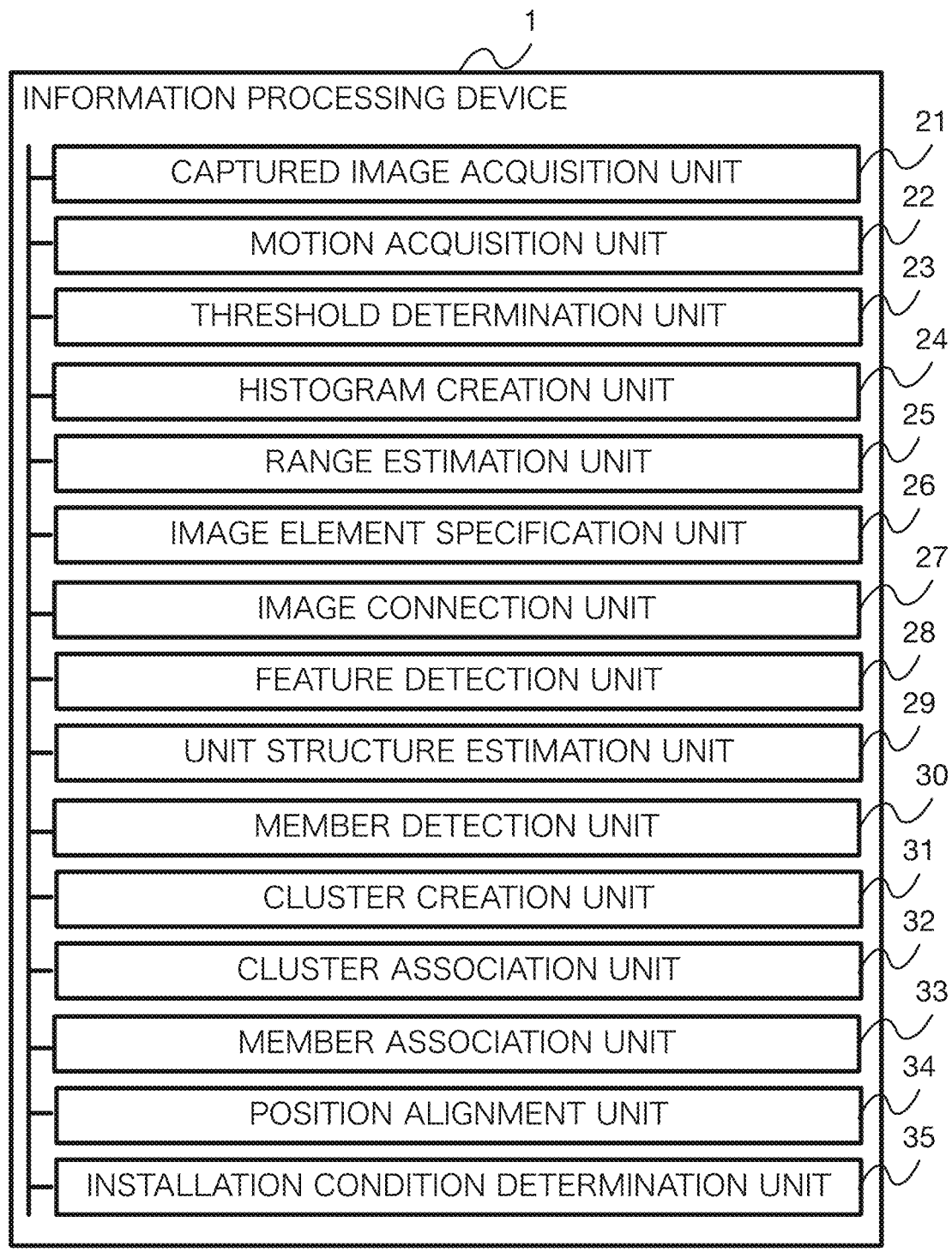
FIG. 2 is a view showing an outline of a functional configuration of an information processing device according to this embodiment.

FIG. 2 is a view showing an outline of a functional configuration of the information processing device according to this embodiment. By reading a program recorded in the storage device 14 to the RAM 13 and executing the program using the CPU 11 so as to control the respective pieces of hardware installed in the information processing device 1, the information processing device 1 functions as an information processing device having a captured image acquisition unit 21, a motion acquisition unit 22, a threshold determination unit 23, a histogram creation unit 24, a range estimation unit 25, an image element specification unit 26, an image connection unit 27, a feature detection unit 28, a unit structure estimation unit 29, a member detection unit 30, a cluster creation unit 31, a cluster association unit 32, a member association unit 33, a position alignment unit 34, and an installation condition determination unit 35. Note that in this embodiment and other embodiments to be described below, the functions of the information processing device 1 are executed by the CPU 11, which is a general purpose processor, but all or some of these functions may be executed by one or a plurality of dedicated processors.

The captured image acquisition unit 21 acquires a plurality of captured images. Here, the method for acquiring the captured images is not limited, but in this embodiment, an example in which captured images captured using the drone 8 on which the imaging device 81 is mounted are acquired through the user terminal 9 will be described. Further, the captured images may be a plurality of static images cut out from a moving image or a plurality of continuously captured static images. Note that the plurality of captured images acquired in this embodiment are captured images acquired while varying a positional relationship between the imaging subject and the imaging position by image capture performed by an imaging device provided on a flying object that flies substantially vertically while facing a predetermined part (in this embodiment, one side face of a construction) of a construction (a steel tower, for example) serving as the imaging subject and while maintaining a substantially constant distance and a substantially constant speed during the image capture. Images of a plurality of unit structures and a plurality of predetermined members included in the construction are captured simultaneously on the captured images.

Figure 3:
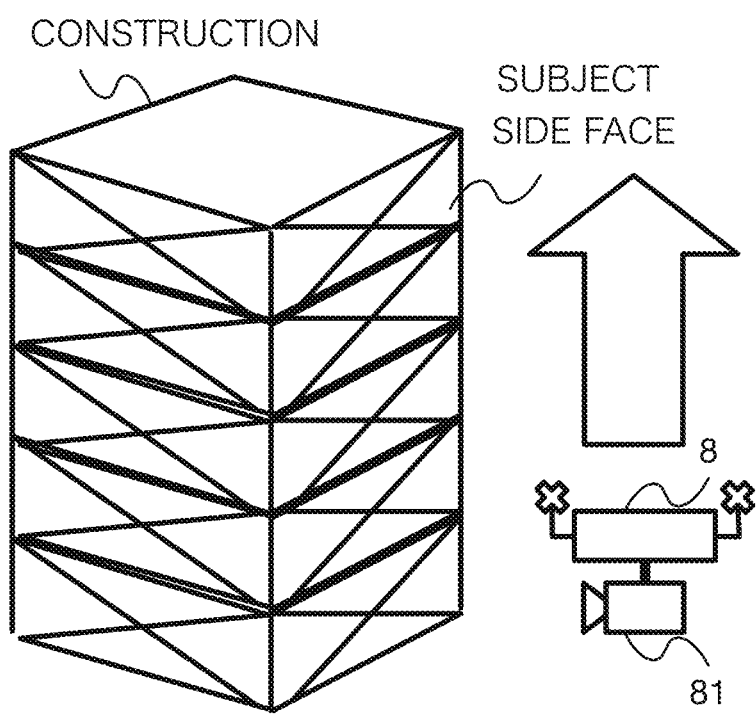
FIG. 3 is a schematic view showing a flight pattern used when capturing images of a construction in this embodiment.

FIG. 3 is a schematic view showing a flight pattern used when capturing images of the construction in this embodiment. Using a case in which the construction is a steel tower as an example, in this embodiment, an operator captures a moving image while causing the drone to fly substantially vertically upward from the bottom of the steel tower in a state where the imaging device mounted on the drone is oriented toward a side face serving as an inspection subject of the steel tower, and as a result, a moving image capturing the entire inspection subject side face of the steel tower sequentially from bottom to top is acquired. Thus, it is possible to acquire a moving image capturing all of a plurality of unit structures (in this embodiment, units in which bars such as reinforcing bars constituting the steel tower intersect in an X shape) and a plurality of predetermined members (in this embodiment, fastening materials) included in the construction that can be seen from the inspection subject side face. Note that the flight pattern of the drone is not limited to the substantially vertical flight cited as an example in this embodiment, and may be set as appropriate in accordance with the shape of the construction.

On the basis of the plurality of captured images, the motion acquisition unit 22 acquires, for each of a plurality of image elements constituting the captured images, a vector (a so-called optical flow) indicating motion on the images of the imaging subject. The optical flows acquired here include a parameter (referred to hereafter as "magnitude") indicating the size of the optical flow for each image element. Here, the image elements may refer to the pixels included in the captured images, a set of pixels in which the imaging subject is captured on the captured images, feature points indicating the image subject specified on the captured images, and so on, but in this embodiment, an example in which the pixels included in the captured images are used as the image elements will be described. More specifically, the motion acquisition unit 22 acquires the optical flow of each of the plurality of image elements constituting the captured images by comparing images that are adjacent to each other in time series based on the plurality of captured images (for example, a plurality of frames constituting the moving image) constituting the moving image acquired by the captured image acquisition unit 21. Note that in this embodiment, an example in which dense optical flow analysis is used to analyze the motion of the pixels as a whole will be described, but there are no limitations on the specific method of analyzing the optical flows.

The threshold determination unit 23 determines a threshold used to exclude image elements not to be included in a histogram showing a magnitude distribution of the plurality of image elements based on the magnitudes of the image elements. For example, the threshold determination unit 23 may arrange the image elements included in at least a series of continuously captured images among the plurality of captured images in ascending/descending order of magnitude, specify a location among the arranged pixels where variation in the magnitude exceeds a predetermined reference, and determine the magnitude corresponding to this location as the threshold.

Figure 4:
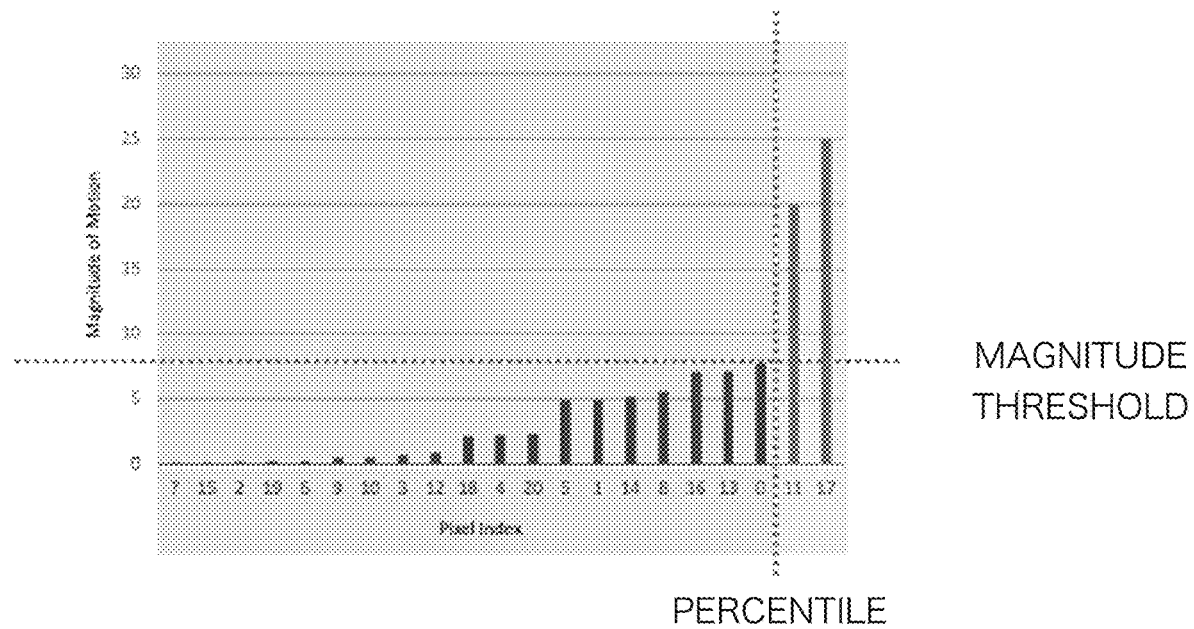
FIG. 4 is a view showing a graph on which pixels are arranged in ascending order of magnitude in this embodiment.

FIG. 4 is a view showing a graph on which the pixels are arranged in ascending order of magnitude in this embodiment. In the figure, the pixels are arranged in ascending order of magnitude on the horizontal axis, while the vertical axis shows the magnitude of each pixel. The threshold determination unit 23 creates a graph on which the pixels are arranged in ascending order of magnitude, and based on the graph specifies a "steep gradient" location where variation in the magnitude exceeds a predetermined reference. There are no limitations on a specific method for specifying the "steep gradient" location, but for example, the threshold determination unit 23 can specify the "steep gradient" location where variation in the magnitude exceeds the predetermined reference using a method of calculating the gradient (incline) of a tangent of a line graph connecting the magnitudes on the graph and specifying a location where the gradient exceeds a predetermined threshold, a method of specifying a location where a difference or a ratio between the magnitudes of pixels that are adjacent or close to each other on the graph exceeds a predetermined threshold, or the like. Note that FIG. 4 shows an example in which the pixels are arranged in ascending order of magnitude, but the magnitudes may be arranged in descending order.

The threshold determination unit 23 then determines a ratio of the number of pixels having magnitudes equal to or smaller than (or less than) the magnitude of the specified location to the total number of pixels arranged on the graph, or a ratio of the number of pixels having magnitudes that exceed (or that equal or exceed) the magnitude of the specified location to the total number of pixels arranged on the graph (in other words, on the graph in FIG. 4, the ratio of the number of pixels on either the left or the right of the location specified as the steep gradient) as a ratio for specifying the threshold. More specifically, in this embodiment, the ratio of the number of pixels having magnitudes equal to or smaller than the magnitude of the specified location to the total number of pixels arranged on the graph is determined as a percentile used to specify the threshold. The threshold determination unit 23 then determines the magnitude corresponding to the percentile for each of the plurality of captured images, and sets the determined magnitude as the threshold used to create a histogram for each captured image.

By determining the magnitude threshold by way of a percentile in this manner, it is possible to determine the threshold based on a percentile serving as a relative degree that can handle the wide variety of different pixel motions on each image of the set of images captured using the drone. Note, however, that instead of a method for determining the magnitude threshold by way of a percentile, a method for directly setting the magnitude corresponding to the specified location as the magnitude threshold, a method for omitting step S103 by employing a preset value as the threshold, a method for specifying a pixel in which the magnitude increases rapidly on each image and setting the threshold on the basis of the specified pixel, and so on may be employed.

The histogram creation unit 24 creates, with respect to the image elements, among the plurality of image elements, excluding the image elements having magnitudes that exceed the threshold determined by the threshold determination unit 23 (in other words, the image elements having magnitudes equal to or smaller than the threshold), a histogram showing the magnitude distribution of the plurality of image elements. More specifically, the histogram creation unit 24 creates a histogram showing the magnitude distribution of the plurality of image elements for each of the plurality of captured images by sorting the image elements having magnitudes equal to or lower than the threshold determined by the threshold determination unit 23 into magnitude sections (bins) set in advance at a predetermined width, and calculating the number of image elements in each bin. In so doing, it is possible to create the histogram so as to exclude unnecessary pixels such as noise, and as a result, the accuracy of the range estimation performed by the range estimation unit 25, to be described below, can be improved.

The range estimation unit 25 refers to the histogram to estimate a magnitude range corresponding to the image elements capturing a predetermined part of the imaging subject within a predetermined distance range of the imaging position. In this embodiment, the structure (referred to hereafter as "the foreground") closest to the front, of the construction serving as the imaging subject, is specified as the predetermined part.

Figure 5:
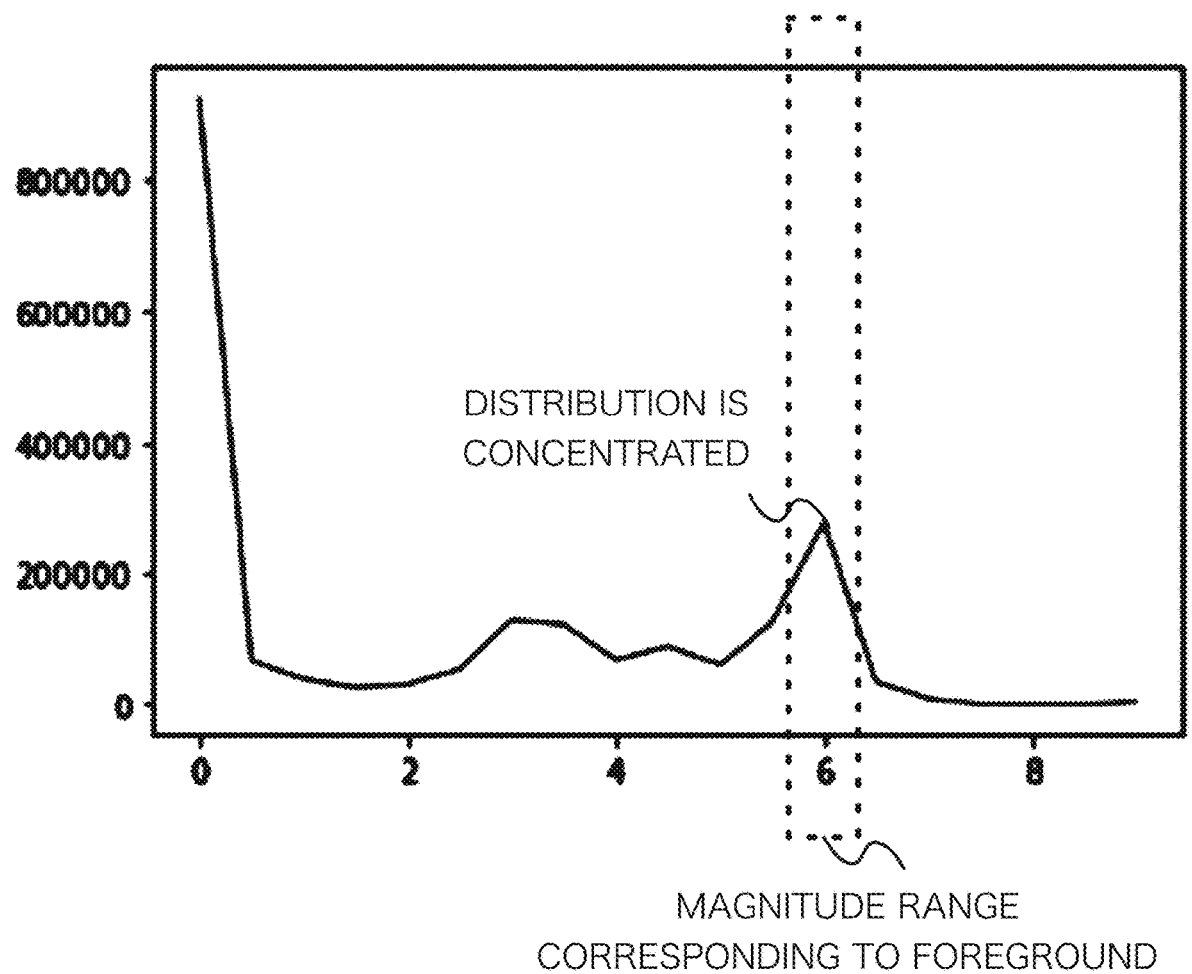
FIG. 5 is a view showing an example of a histogram showing a magnitude distribution of a captured image, created in this embodiment.

FIG. 5 is a view showing an example of the histogram created in this embodiment, showing the magnitude distribution of the captured image. In this embodiment, the range estimation unit 25 specifies a bin of the histogram in which the distribution is concentrated, and estimates the magnitude range corresponding to the foreground based on the specified bin. The magnitude range estimated here may be identical to or different from the specified bin section. For example, the range estimation unit 25 can estimate a predetermined range centering on the specified bin as the magnitude range corresponding to the image elements capturing the predetermined part. The size of the range may be determined based on the accuracy of the captured image, the distance between the imaging device 81 and the construction at the time of image capture, and so on.

The image element specification unit 26 specifies the image elements capturing the predetermined part (in this embodiment, the foreground serving as the frontmost structure of the construction) among the plurality of image elements constituting the captured image by specifying the image elements belonging to the estimated magnitude range.

The image connection unit 27 connects the plurality of captured images so that the image elements specified by the image element specification unit 26, included in each of the plurality of captured images, are aligned, and in so doing acquires a connected image (a panoramic image or the like, for example) capturing a wider range than the range that can be captured at one time from a single imaging position. More specifically, for example, the image connection unit 27 acquires a connected image by matching feature points detected in common on the plurality of continuously captured images and connecting the images. At this time, the image connection unit 27 can acquire a connected image connected so that the predetermined parts (in this embodiment, the foreground) of the respective captured images are aligned by matching feature points corresponding to the image elements specified by the image element specification unit 26 (in other words, the image elements corresponding to the predetermined part, such as the foreground) and connecting the images. Note that since feature point detection/extraction is a conventional technique, detailed description thereof has been omitted. However, the feature points can be detected and extracted using a standard OpenCV module (feature2d), for example.

Further, when connecting the images, the image connection unit 27 may acquire a connected image by calculating a homography matrix (a perspective transformation matrix) of the set of captured images based on the plurality of captured images (the frames of the moving image) and transforming the plurality of captured images into a single connected image using the calculated homography matrix. More specifically, in this embodiment, the image connection unit 27 calculates a homography matrix relating to the plurality of captured images by matching feature points of the image elements corresponding to the foreground, specified by the image element specification unit 26, between the plurality of captured images. The image connection unit 27 then transforms the plurality of captured images using the homography matrix so that planes corresponding to the foreground on the plurality of captured images are aligned on a single connected image, and by arranging the transformed images on a single connected image, acquires a connected image on which the foreground as a whole is disposed on a single plane. Note that the image connection unit 27 may calculate the homography matrix calculated for the set of captured images using the captured image showing the center of the construction serving as the imaging subject as a reference, and in this case, the image showing the center of the construction may be determined in accordance with the timings at which the captured images are captured so as to be the n/2-th captured image among a set of n captured images, for example. Alternatively, the image connection unit 27 may calculate the homography matrix calculated for the set of captured images using the captured image showing the center of a specified unit structure (unit) of the construction as a reference.

The feature detection unit 28 detects, from a construction image acquired by the imaging device by capturing images of a construction including a plurality of unit structures (referred to hereafter as "units") respectively having identical or similar external structures, a feature relating to an external structure that is substantially shared by the plurality of units. In this embodiment, the connected image acquired by the image connection unit 27 is used as the construction image. Note, however, that the construction image serving as the processing subject of inspection processing is not limited to the connected image acquired by the image connection unit 27 and may be a construction image acquired by another method. Further, in this embodiment, a structure in which bars such as reinforcing bars constituting the construction intersect in a diagonal shape (an X shape) is used as the external structure, and a feature acquired on the basis of a location (a straight line intersection or an edge)

where edges or line segments detected by image recognition intersect in a diagonal shape is used as the feature relating to the external structure.

Furthermore, in this embodiment, the feature detection unit 28 detects edges or line segments on a construction image capturing the inspection subject side face of the inspection subject construction from the construction image on the basis of the image elements capturing the predetermined part (in this embodiment, the foreground specified by the image element specification unit 26) of the construction image, the predetermined part having been specified by the image element specification unit 26, and detects the feature relating to the external structure by referring to the detected edges or line segments. More specifically, the feature detection unit 28 detects a feature relating to an external structure in which bars such as reinforcing bars constituting the steel tower intersect in a diagonal shape (an X shape) by detecting straight lines on the construction image, extracting the straight lines included in the predetermined part specified by the image element specification unit 26 by means of filtering (a mask) for extracting only the image elements corresponding to the predetermined part, and detecting intersections between members extending in a diagonal shape.

The unit structure estimation unit 29 estimates, for each of the plurality of features detected by the feature detection unit 28, a predetermined range including the feature as a part of the construction image corresponding to one of the plurality of units included in the construction.

Figure 6:
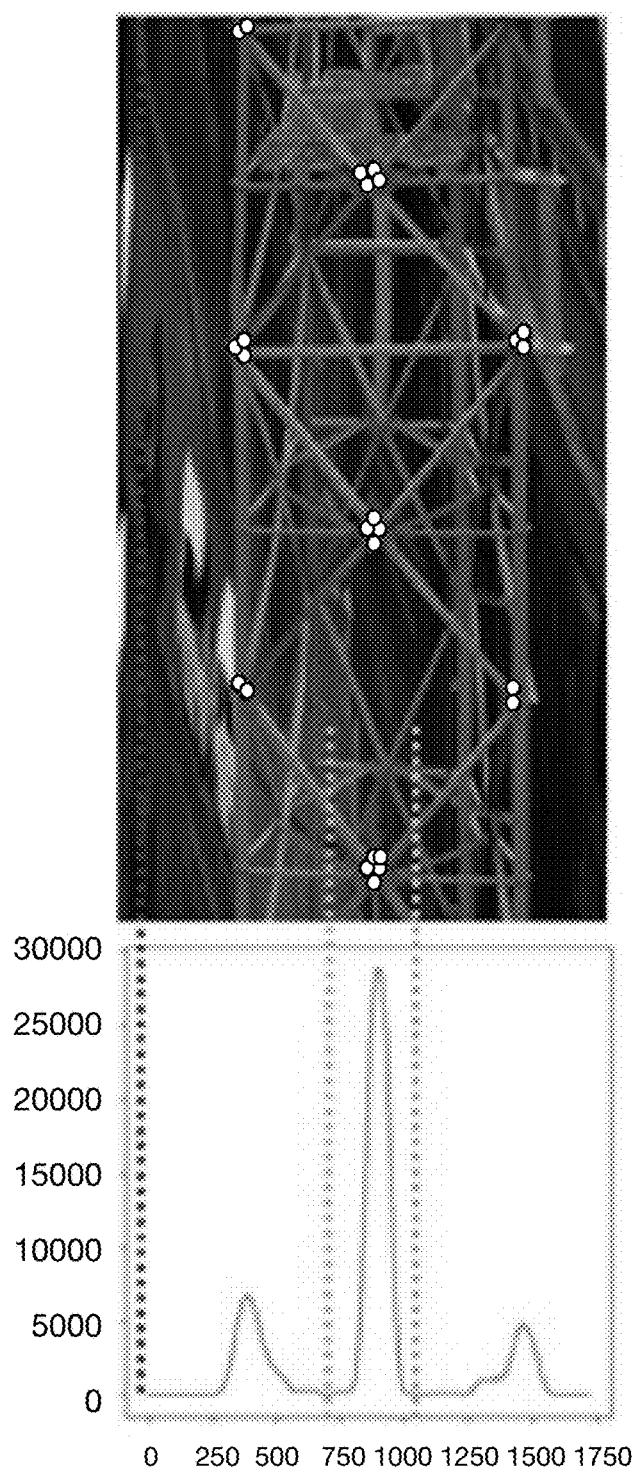
FIG. 6 is a view (A) showing an outline of unit estimation according to this embodiment.
Figure 7:
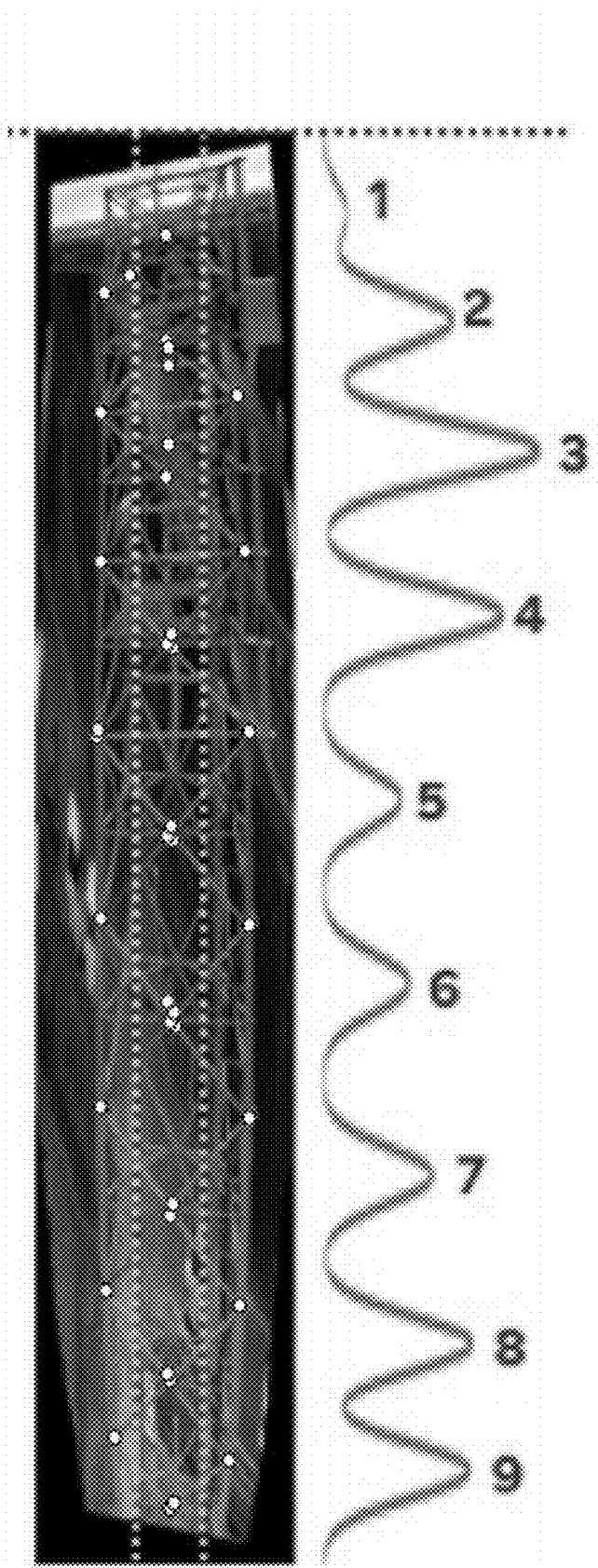
FIG. 7 is a view (B) showing an outline of unit estimation according to this embodiment.

FIGS. 6 and 7 are views showing an outline of unit estimation according to this embodiment. The construction serving as the subject of this embodiment is a steel tower structured such that units having an external structure in which bars such as reinforcing bars intersect in a diagonal shape (an X shape) are arranged in a vertical direction. An example of a method for estimating a unit structure in relation to this type of construction will be described with reference to FIGS. 6 and 7. First, the unit structure estimation unit 29 creates a graph counting the number of feature points in the vertical direction (a graph showing the feature point density in the vertical direction; see FIG. 6) on the basis of the plurality of feature points detected by the feature detection unit 28, and by specifying a range of a row of pixels in which the feature point density is high, specifies a central region (a region through which the centers of the units pass) of the steel tower. Next, the unit structure estimation unit 29 creates a graph counting the feature points in a horizontal direction (a graph showing the feature point density in a horizontal direction; see FIG. 7) on the basis of the plurality of feature points in the central region of the steel tower, among the plurality of feature points specified by the feature detection unit 28, and by specifying a plurality of ranges of rows of pixels in which the feature point density is high, specifies the center of each unit (the position where the bars constituting the unit intersect in an X shape).

When the center of each unit has been specified, the unit structure estimation unit 29 specifies the region of each specified unit, including the center of the unit. When specifying the region of each unit, it is also possible to specify the terminal ends of the region using a similar method to that used to specify the center of the unit. Specifically, by referring to the graph counting the number of feature points in the vertical direction (the graph showing the feature point density in the vertical direction; see FIG. 6), which is created on the basis of the plurality of feature points detected by the feature detection unit 28, the unit structure estimation unit 29 specifies ranges of rows of pixels having a high feature point density other than the range corresponding to the center of the unit as terminal end regions on the left and right of the unit. The unit structure estimation unit 29 then specifies a plurality of ranges of rows of pixels having a high feature point density by referring to the graph counting the feature points in the horizontal direction (the graph showing the feature point density in the horizontal direction; see FIG. 7), which is created on the basis of the plurality of feature points in the left and right terminal end regions of the unit, among the plurality of feature points specified by the feature detection unit 28, and in so doing specifies the terminal ends of each unit.

When the region (a predetermined range) of each unit has been specified, the unit structure estimation unit 29 attaches a label for univocally identifying the unit to each specified unit. The method for attaching the label is not limited, but for example, labels constituted by numerals and/or alphabetic characters may be attached by being allocated in ascending order from the uppermost unit to the lowermost unit.

The member detection unit 30 detects a plurality of predetermined members (for example, fastening materials for fastening screws, such as bolts, nuts, and washers) included in the units from the construction image. In this embodiment, the member detection unit 30 detects the plurality of predetermined members included in the units using a machine learning model created by performing deep learning or the like in advance on the predetermined members captured on the construction image. Note, however, that there are no limitations on the specific method used by the member detection unit 30 to detect the predetermined members from the construction image. For example, the member detection unit 30 can also detect the plurality of predetermined members included in the units by a method of matching pre-prepared images of the predetermined members with the construction image, a method of detecting pre-prepared unique patterns of the predetermined members by means of feature detection, and so on.

The cluster creation unit 31 creates a plurality of clusters of densely installed members by clustering the detected plurality of members based on the distances between the members. In this embodiment, the cluster creation unit 31 clusters the members using density-based clustering such as DBScan. Note, however, that there are no limitations on the specific method of clustering the members, and another clustering method may be employed.

Figure 8:
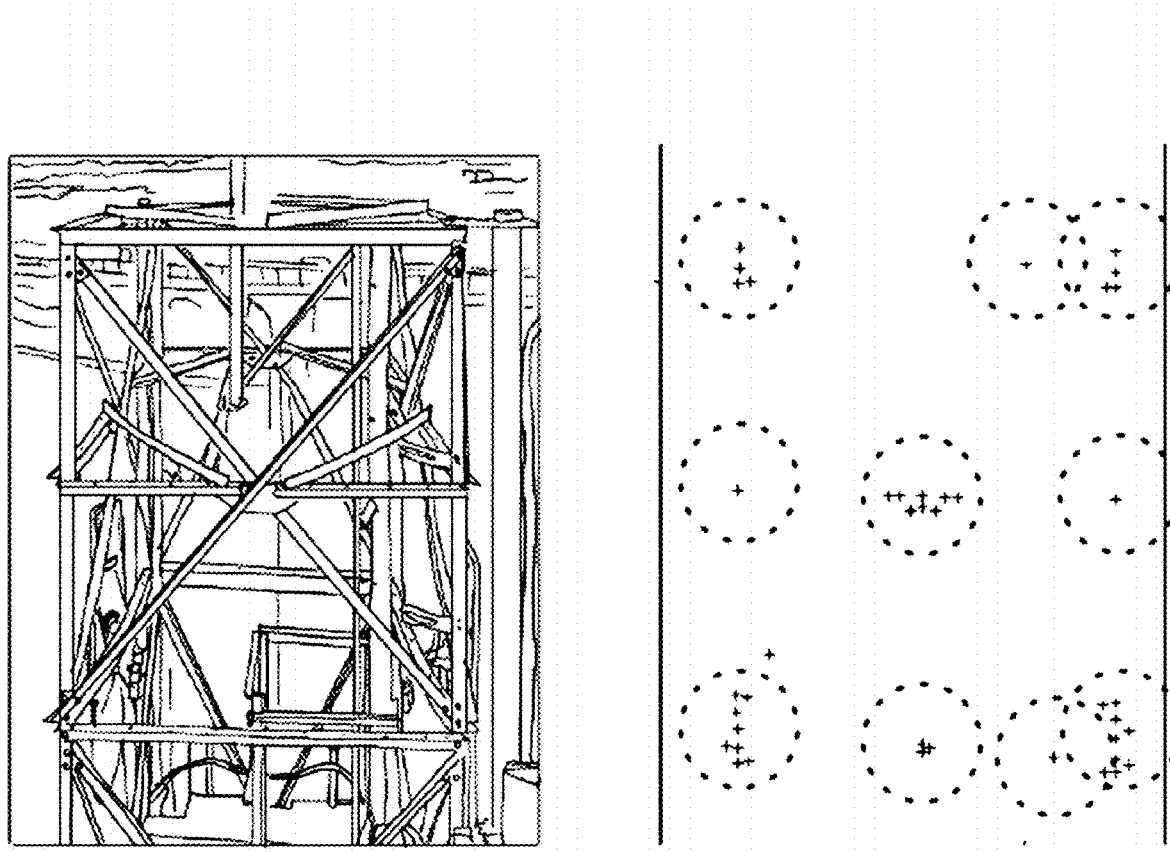
FIG. 8 is a view showing clustering of members detected from a construction image in this embodiment.

FIG. 8 is a view showing clustering of the members detected from the construction image in this embodiment. The right side of FIG. 8 shows how predetermined members such as fastening materials are detected from the construction image shown on the left side of FIG. 8, and the detected members are clustered based on the positions thereof. Here, the dotted line circles respectively denote clusters.

The cluster association unit 32 compares respective positions of the plurality of clusters with respective positions of a plurality of pre-prepared clusters of members indicated by the design data of the construction, and in so doing associates the clusters on the construction image with the clusters in the design data. In this embodiment, the center of the cluster (more specifically, for example, the center of gravity or the center of the bounding rectangle) is used as the position of the cluster. Accordingly, the cluster association unit 32 calculates the centers of the clusters created by the cluster creation unit 31, calculates the centers of the clusters of the members indicated by the design data, compares the respective center positions, and in so doing associates matching or similar clusters with each other. At this time, the clusters of the members indicated by the design data may also be created by the cluster creation unit 31 described above.

Figure 9:
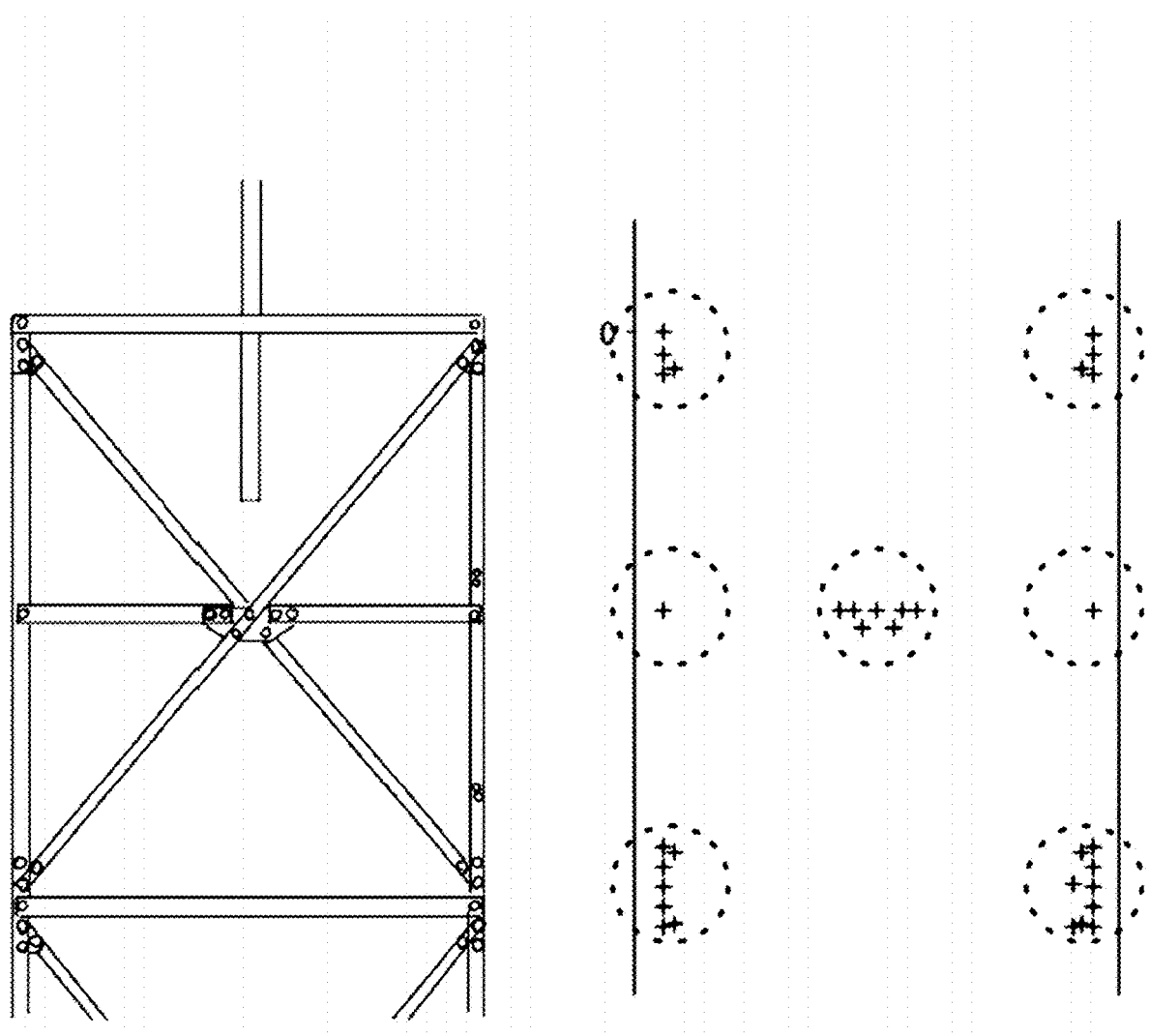
FIG. 9 is a view showing clustering of members detected from design data in this embodiment.

FIG. 9 is a view showing clustering of members detected from design data in this embodiment. The right side of FIG. 9 shows how predetermined members such as fastening materials are detected from design data shown on the left side of FIG. 9, and the detected members are clustered based on the positions thereof. Here, the dotted line circles respectively denote clusters. Note that in this embodiment, an example using a design image as the design data of the construction is described, but the design data of the construction are not limited to an image, and any data from which the relative positional relationships between the fastening materials can be ascertained may be used as the design data of the construction.

The member association unit 33 compares the positions of the members belonging to the clusters on the construction image with the positions of the members belonging to the clusters in the design data, which are associated with the clusters on the construction image by the cluster association unit 32, and in so doing associates the members on the construction image with the members indicated by the design data. A similar method to that used by the cluster association unit 32 to associate the clusters may be employed as the specific association method. The member association unit 33 compares the positions of the members belonging to the clusters between the associated clusters of the construction image and the design data, and associates matching or similar members with each other.

The position alignment unit 34 aligns the positions of the construction image and the design data based on the results of the association performed by the member association unit 33 between the members on the construction image and the members indicated by the design data. More specifically, the position alignment unit 34 aligns the positions of the construction image and the design data by deforming the construction image so that the positions of the members on the construction image and the positions of the members in the design data, associated with each other by the member association unit 33, are aligned (or as close as possible).

The installation condition determination unit 35 determines the installation condition of the members, such as the fastening portions, included in the captured images based on the images of the members. Here, the specific determination method can be employed as appropriate in accordance with the embodiment and is not limited. Accordingly, detailed description thereof has been omitted. For example, the installation condition determination unit 35 detects differences relating to the total number of members such as fastening portions by comparing the images of the separated units on the construction image with the design data (the design images) of the units.

<Processing Flow>

Next, a flow of the processing executed by the information processing device according to this embodiment will be described. Note that the specific content and the processing sequence of the processing described below are examples used to implement the present disclosure, and the specific processing content and processing sequence may be selected as appropriate in accordance with the mode of implementation of the present disclosure.

Figure 10:
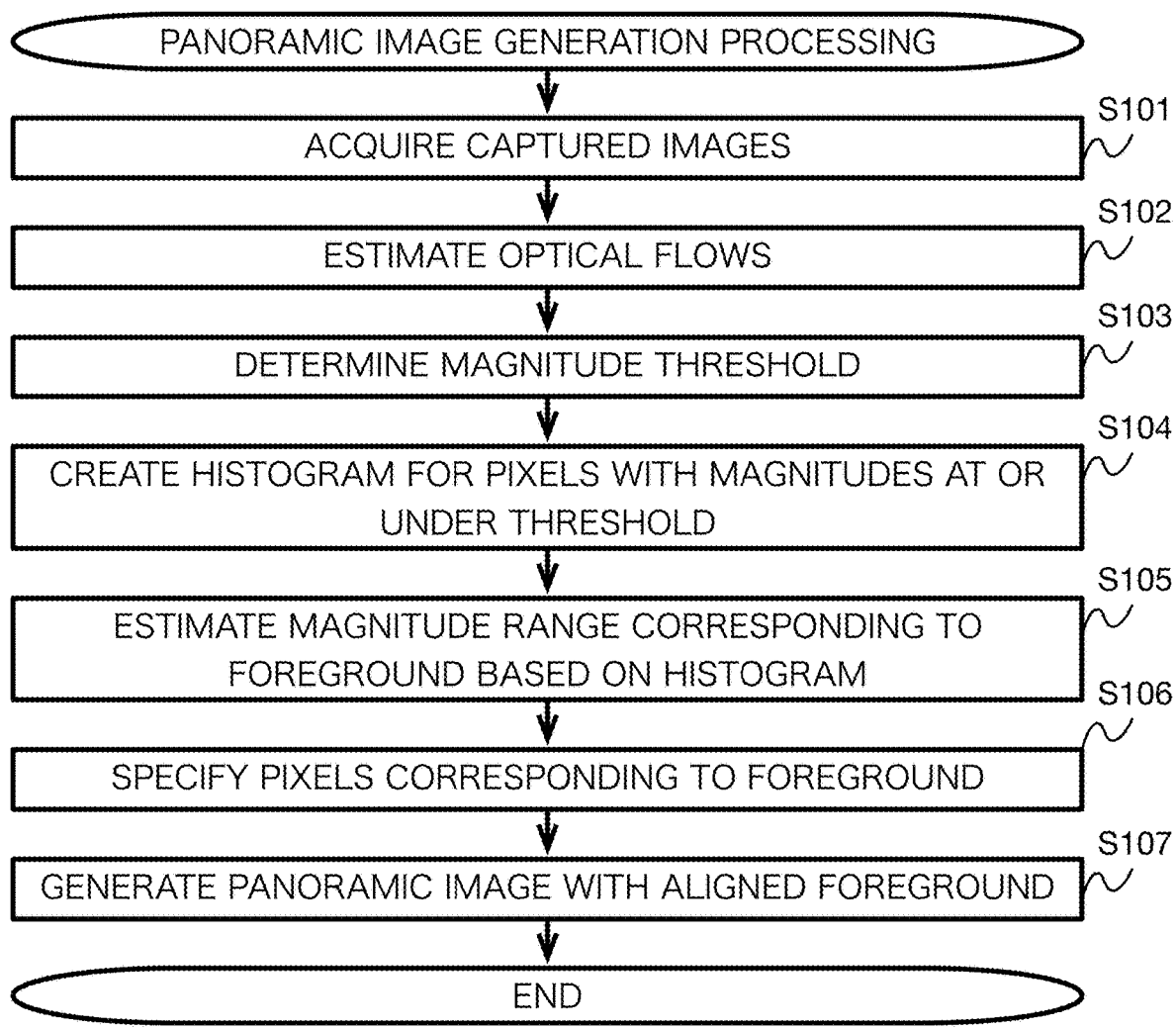
FIG. 10 is a flowchart showing a flow of panoramic image generation processing according to this embodiment.

FIG. 10 is a flowchart showing a flow of panoramic image generation processing according to this embodiment. The processing shown on the flowchart is executed when monitoring or inspecting a construction during or after installation of the construction, using input of a captured image or input by the operator of an instruction to execute the panoramic image generation processing as a trigger.

In step S101, captured images are acquired. The operator captures images of the side face serving as the inspection subject of the construction using the imaging device 81, and inputs the image data of the acquired captured images into the information processing device 1. There are no limitations on the imaging method and the method for inputting the image data into the information processing device 1, but in this embodiment, images of the side face serving as the inspection subject of the construction are captured using the drone 8 on which the imaging device 81 is mounted, the image data of the captured images are input into the information processing device 1 by transferring the image data from the imaging device 81 to the user terminal 9 by communication or via a recording medium and then further transferring the image data to the information processing device 1 over a network, whereby the captured images are acquired by the captured image acquisition unit 21. Next, the processing advances to step S102.

In step S102, the optical flows are estimated. The motion acquisition unit 22 acquires an optical flow for each of the plurality of pixels constituting the captured images by comparing images that are adjacent to each other in time series based on the plurality of captured images (the plurality of frames constituting the moving image) constituting the moving image acquired in step S101. As described above, the optical flows acquired here each include a magnitude serving as a parameter indicating the size of the optical flow for each pixel. Next, the processing advances to step S103.

In step S103 and step S104, a partially flattened histogram of the optical flows is created. The threshold determination unit 23 specifies the location where variation in the magnitude exceeds a predetermined reference when the pixels included in a series of captured images are arranged in ascending/descending order of magnitude, and determines, for each of the plurality of captured images, a magnitude threshold of the captured image based on a percentile corresponding to the specified location (step S103). The histogram creation unit 24 then creates, for each of the plurality of captured images, a histogram showing the magnitude distribution of a plurality of pixels excluding pixels corresponding to magnitudes that exceed the threshold determined in step S103 (in other words, the pixels having magnitudes equal to or lower than the threshold) (step S104). Next, the processing advances to step S105.

In step S105 and step S106, the foreground on each of the set of captured images is separated based on the histogram of the optical flows. The range estimation unit 25 refers to the histogram created in step S104 to specify the magnitude section (bin) in which the distribution is concentrated, and in so doing estimates the magnitude range corresponding to the pixels capturing a predetermined part (in this embodiment, the foreground) of the imaging subject within a predetermined distance range of the imaging position (step S105). The image element specification unit 26 then specifies the pixels capturing the foreground, among the plurality of pixels constituting the captured images, by specifying the pixels belonging to the estimated magnitude range (step S106). Next, the processing advances to step S107.

In step S107, a panoramic image of the construction is generated based on the set of captured images. Here, the panoramic image is generated such that in the set of captured images, the set of foregrounds separated in step S106 are joined together in alignment. The image connection unit 27 generates a connected static image (a panoramic image) by connecting the plurality of captured images so that the pixels corresponding to the foreground, specified in step S106, are aligned. Note that at this time, as described above in the description of the image connection unit 27, the connected image may be acquired by subjecting the captured images to perspective transformation using a nomography matrix. The processing shown on the flowchart is then terminated.

Figure 11:
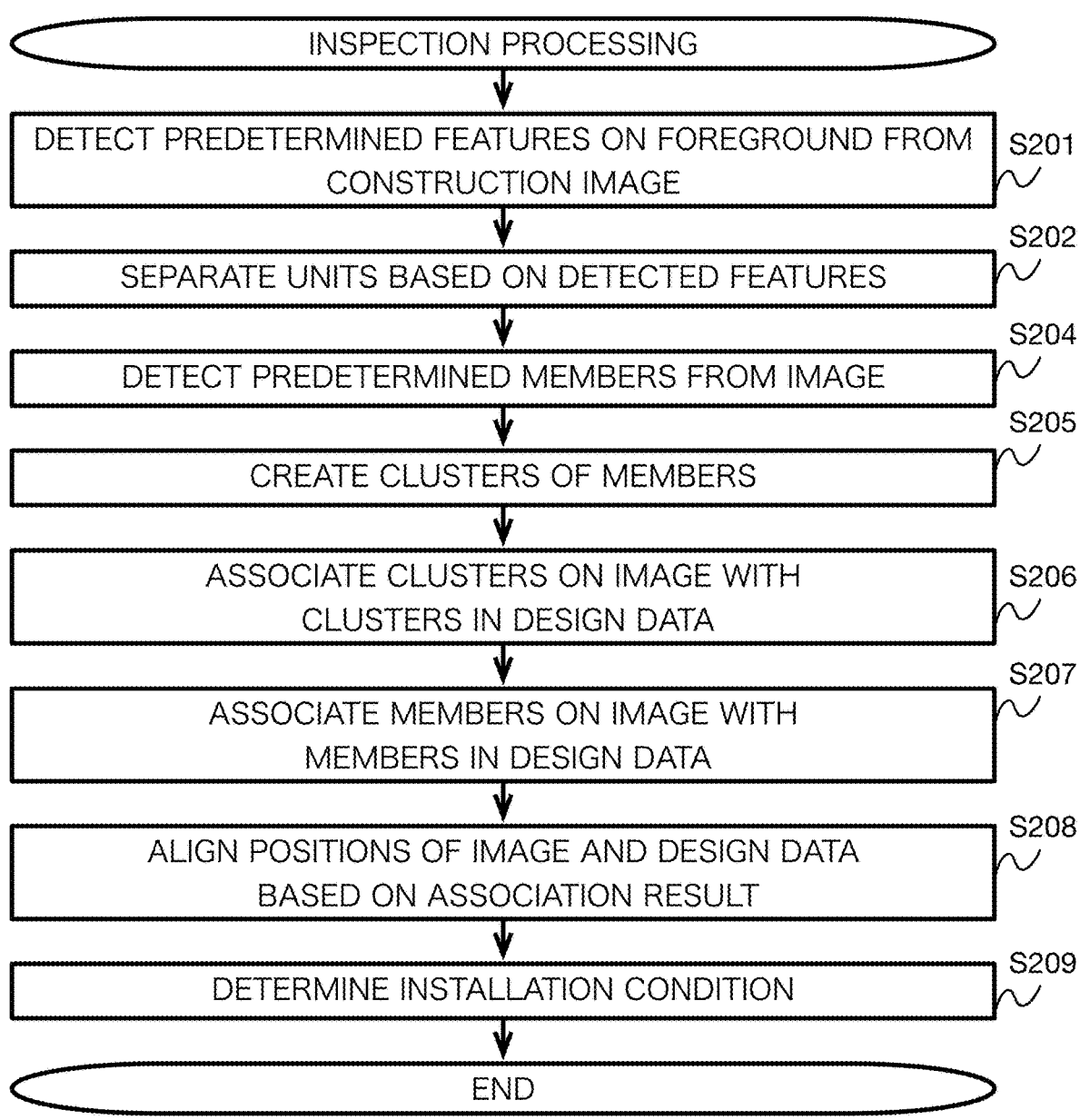
FIG. 11 is a flowchart showing a flow of inspection processing according to this embodiment.

FIG. 11 is a flowchart showing a flow of inspection processing according to this embodiment. The processing shown on this flowchart is executed when monitoring or inspecting the construction during or after installation of the construction, using input of the construction image or input by the operator of an instruction to execute the inspection processing as a trigger. Note that here, a case in which the connected image generated by the panoramic image generation processing described above is input as the construction image will mainly be described, but the construction image may be acquired by another method.

In step S201, features corresponding to external structures of a construction image capturing the inspection subject side face of the construction (in this embodiment, a steel tower) serving as the inspection subject are detected from the construction image based on pixels capturing a predetermined part (in this embodiment, the foreground) of the construction image. The feature detection unit 28 extracts straight lines included in the foreground (in other words, straight lines corresponding to front bars), among the straight lines on the construction image, by means of filtering (a mask) for extracting only the pixels corresponding to the foreground, and by detecting intersections between members extending in a diagonal shape, detects features corresponding to external structures in which bars such as reinforcing bars constituting the steel tower intersect in a diagonal shape (an X shape). Next, the processing advances to step S202.

In step S202, a plurality of units constituting the construction are separated. The unit structure estimation unit 29 estimates, for each of the plurality of features detected in step S201, a predetermined range including the feature as a part of the construction image corresponding to one of a plurality of units included in the construction, and attaches a label for identifying the unit to each estimated unit. Next, the processing advances to step S204.

From step S204 to step S208, fastening materials are detected from the construction image, the fastening materials detected from the image are associated with fastening material positions in the design data, and the positions of the respective fastening materials are aligned. The member detection unit 30 detects a plurality of predetermined members (in this embodiment, fastening materials) included in each unit from the construction image (step S204). The cluster creation unit 31 then clusters the plurality of detected members based on the distances between the members, and in so doing creates a plurality of clusters of densely installed members (step S205). The cluster association unit 32 compares the respective positions of the plurality of clusters created in step S205 with the respective positions of a plurality of pre-prepared clusters of members indicated in the design data of the construction, and in so doing associates the clusters on the construction image with the clusters in the design data (step S206).

For each of the associated clusters, the member association unit 33 compares the positions of the members belonging to the cluster with the positions of the members belonging to the cluster in the design data that was associated with the corresponding cluster in step S206, and in so doing associates the members on the construction image with the members indicated by the design data (step S207). The position alignment unit 34 aligns the positions of the construction image and the design data based on the association result acquired in step S207 between the members on the construction image and the members indicated by the design data (step S208). Next, the processing advances to step S209.

In step S209, the installation condition is determined. The installation condition determination unit 35 determines installation conditions such as the total number of members (fastening portions) included in each unit, and when there is an abnormality therein, the installation condition determination unit 35 detects the abnormality. The user terminal 9 may be notified of the determination result. The processing shown on the flowchart is then terminated.

<Variation>

In the embodiment described above, an example in which the input construction image (the panoramic image in a case where the panoramic image generated by the panoramic image generation processing is used) is used as is in the processing from step S204 onward was described, but instead, a connected image created for each unit may be used as the construction image. In this case, a connected image is created for each unit based on the set of input captured images. The image connection unit 27 generates a connected image for each unit by connecting a plurality of captured images relating to each specified unit so that the pixels corresponding to the foreground are aligned. Note that at this time, the connected images may be acquired by subjecting the captured images to perspective transformation using a nomography matrix, similarly to a case where a panoramic image generation corresponding to the entire construction is generated, as described above in step S107.

What is claimed is:

1. An information processing device comprising:
at least one memory configured to store program code; and
at least one processor configured to read the program code and operate as instructed by t program code, the program code including:
acquiring code configured to cause the at least one processor to acquire, based on a plurality of captured images acquired by performing image capture while varying a positional relationship between an imaging subject and an imaging position of a device that moves to change the imaging position of the device to capture the plurality of images, a motion magnitude for each of a plurality of image elements constituting the plurality of captured images of the imaging subject;
arranging code configured to cause the at least one processor to arrange the plurality of image elements in an ascending/descending order;
identifying code configured to cause the at least one processor identify a location in the arranged plurality of image elements where variation in the motion magnitude exceeds a predetermined reference;
determining code configured to cause the at least one processor to determine a motion magnitude corresponding to the identified location as a threshold used to exclude image elements not to be included in a histogram showing a distribution of the motion magnitudes of the plurality of image elements based on the motion magnitudes of the plurality of image elements;
creating code configured to cause the at least one processor to create the histogram with respect to image elements, among the plurality of image elements, excluding image elements having motion magnitudes that exceed the threshold;

estimating code configured to cause the at least one processor to estimate, based on the histogram, a motion magnitude range corresponding to image elements of the plurality of image elements capturing a predetermined part of the imaging subject, the predetermined part being within a predetermined distance range of the imaging position; and specifying code configured to cause the at least one processor to specify the image elements of the plurality of image elements capturing the predetermined part, among the plurality of image elements constituting the captured images, by specifying the image elements of the plurality of image elements belonging to the estimated motion magnitude range.

2. The information processing device according to claim 1, wherein the specifying code further causes the at least one processor to specify a motion magnitude section of the histogram in which the distribution is concentrated, and estimates the motion magnitude range based on the specified motion magnitude section.

3. The information processing device according to claim 1, wherein the acquiring code further causes the at least one processor to acquire a connected image capturing a wider range than a range captured at one time from a single imaging position by connecting the plurality of captured images so that the image elements specified by the processor and included in each of the plurality of captured images are aligned.

4. The information processing device according to claim 1, wherein the plurality of captured images are captured images acquired by performing image capture using an imaging device provided on a flying object that flies while maintaining a substantially constant distance from the predetermined part of the imaging subject.

5. The information processing device according to claim 1, wherein the plurality of captured images are captured images acquired by performing image capture using an imaging device provided on a flying object that flies while maintaining a substantially constant speed during image capture.

6. The information processing device according to claim 1, wherein the plurality of captured images are captured images acquired by performing image capture using an imaging device provided on a flying object that flies substantially vertically while facing one side face of a construction serving as the imaging subject.

7. A method for causing a computer to execute:

acquiring, based on a plurality of captured images acquired by performing image capture while varying a positional relationship between an imaging subject and an imaging position of a device that moves to change the imaging position of the device to capture the plurality of image, a motion magnitude for each of a plurality of image elements constituting the plurality of captured images of the imaging subject;

arranging the plurality of image elements in an ascending/descending order;

identifying a location in the arranged plurality of image elements where variation in the motion magnitude exceeds a predetermined reference;

determining a motion magnitude corresponding to the identified location as a threshold used to exclude image elements not to be included in a histogram showing a distribution of the motion magnitudes of the plurality of image elements based on the motion magnitudes of the plurality of image elements;

creating the histogram with respect to image elements, among the plurality of image elements, excluding image elements having motion magnitudes that exceed the threshold;

estimating, based on the histogram, a motion magnitude range corresponding to image elements of the plurality of image elements capturing a predetermined part of the imaging subject, the predetermined part being within a predetermined distance range of the imaging position; and specifying the image elements of the plurality of image elements capturing the predetermined part, among the plurality of image elements constituting the captured images, by specifying the image elements of the plurality of image elements belonging to the estimated motion magnitude range.

8. A non-transitory computer-readable recording medium on which is recorded a program for causing a computer to execute a process comprising:

acquiring, based on a plurality of captured images acquired by performing image capture while varying a positional relationship between an imaging subject and an imaging position of a device that moves to change the imaging position of the device to capture the plurality of images, a motion magnitude for each of a plurality of image elements constituting the plurality of captured images of the imaging subject;

arranging the plurality of image elements in an ascending/descending order;

identifying a location in the arranged plurality of image elements where variation in the motion magnitude exceeds a predetermined reference;

determining a motion magnitude corresponding to the identified location as a threshold used to exclude image elements not to be included in a histogram showing a distribution of the motion magnitudes of the plurality of image elements based on the motion magnitudes of the plurality of image elements;

creating the histogram with respect to image elements, among the plurality of image elements, excluding image elements having motion magnitudes that exceed the threshold;

estimating, based on the histogram, a motion magnitude range corresponding to image elements of the plurality of image elements capturing a predetermined part of the imaging subject, the predetermined part being within a predetermined distance range of the imaging position; and specifying the image elements of the plurality of image elements capturing the predetermined part, among the plurality of image elements constituting the captured images, by specifying the image elements of the plurality of image elements belonging to the estimated motion magnitude range.

* * * * *